(12) United States Patent
Hurwitz

(10) Patent No.: US 8,588,380 B2
(45) Date of Patent: *Nov. 19, 2013

(54) COUPLING SIGNAL PROCESSING CIRCUITRY WITH A WIRELINE COMMUNICATIONS MEDIUM

(75) Inventor: Jonathan Ephraim David Hurwitz, Edinburgh (GB)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,629

(22) Filed: May 31, 2012

(65) Prior Publication Data

US 2012/0237010 A1   Sep. 20, 2012

Related U.S. Application Data

(63) Continuation of application No. 12/075,888, filed on Mar. 14, 2008, now Pat. No. 8,213,582.

(51) Int. Cl.
*H04M 11/00* (2006.01)

(52) U.S. Cl.
CPC ................................. *H04M 11/00* (2013.01)
USPC ............... 379/90.01; 379/93.01; 379/394; 379/400; 379/93.05

(58) Field of Classification Search
USPC .......... 379/93.01, 90.01, 93.05, 93.06, 93.09, 379/402, 390.04, 394, 398, 399.01, 413.2; 375/257, 222, 258
See application file for complete search history.

(56) References Cited

U.S. PATENT DOCUMENTS

| | | | | |
|---|---|---|---|---|
| 3,801,744 A | * | 4/1974 | Hayashi | 379/81 |
| 4,567,328 A | * | 1/1986 | Carrasco et al. | 379/100.06 |
| 2005/0273282 A1 | * | 12/2005 | Mollenkopf | 702/62 |
| 2008/0285594 A1 | * | 11/2008 | Ray et al. | 370/481 |

* cited by examiner

*Primary Examiner* — Melur Ramakrishnaiah
(74) *Attorney, Agent, or Firm* — Garlick & Markison; Holly L. Rudnick

(57) ABSTRACT

A system and method for processing a communication signal from a wireline is provided. The system comprises a coupling unit and signal processing circuitry. The coupling unit comprises a transformer and is configured to receive the communication signal from the wireline. The coupling unit is also configured to generate a first signal based on amplifying or attenuating the communication signal according to a first winding ratio of the transformer and a second signal based on amplifying or attenuating the communication signal according to a second winding ratio of the transformer. The signal processing circuitry is configured to process the first signal and the second signal.

20 Claims, 6 Drawing Sheets

US 8,588,380 B2

COUPLING SIGNAL PROCESSING CIRCUITRY WITH A WIRELINE COMMUNICATIONS MEDIUM

CROSS-REFERENCE TO PRIORITY APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 12/075,888, entitled "Coupling Signal Processing Circuitry with a Wireline Communications Medium," filed Mar. 14, 2008.

BACKGROUND

1. Technical Field

This invention relates generally to the field of wireline communications and more particularly to coupling of signal processing circuitry with a wireline communications medium.

2. Related Art

In communications systems, a communication signal may be received from a wireline. The communication signal is typically an electromagnetic signal generated to transmit information or data. The wireline may be any physical medium configured to carry a signal such as a wire, a twisted pair cable, a coaxial cable, an electrical cable, or the like. The wireline may include a plain old telephone service (POTS) line, a Digital Subscriber Line (DSL), an Asymmetric Digital Subscriber Line (ADSL), an Ethernet line, or a powerline. The wireline transmits many signals having varying characteristics. For example, signals may be within various frequency bands or of varying strengths. The wireline may also transmit a power signal which is not a communication signal, because the power signal may not transmit information or data.

The range of signal strengths depends on the strength and position of a transmitter, impedance, and noise on the wireline. For example, in a powerline, the range of signal strengths varies from the maximum allowable injected power to the noise floor. To illustrate, in the 1-30 MHz band, the maximum allowable injected power is approximately −50 dBm/Hz while the noise floor is approximately −150 dBm/Hz. This results in an overall input dynamic range of about 90 dB. Circuitry that is configured to receive a relatively large signal is typically less adept at processing small signals and vice-versa. There is, therefore, a trade-off between detecting a large dynamic range of communication signals and detection sensitivity.

FIG. 1 illustrates a communications system 100 for processing a communication signal in the prior art. In the communications system 100, a coupling unit transfers the communication signal from a wireline input 102 from to signal processing circuitry. The coupling unit may include a first filter 104 and a single ratio transformer 106. The first filter 104 and the single ratio transformer 106 isolate the signal processing circuitry and transform the voltage of the received communication signal to prevent damage to the signal processing circuitry. The single ratio transformer 106 is a transformer having a single winding ratio between a primary coil and a secondary coil. The winding ratio is the ratio of the number of windings between the primary coil and the secondary coil, and dictates the voltage gain or attenuation of the received communication signal by the single ratio transformer 106. A second filter 108 filters the signal output from the single ratio transformer 106.

A transformer having a single winding ratio, such as single ratio transformer 106, will always produce an output signal having a fixed magnitude ratio relative to the received signal. As a result, the signal processing circuitry following the transformer must be configured to receive signals of a wide range in magnitudes, or distortions may occur. Input signals that are too large may be clipped while input signals that are too small may be indistinguishable from a noise level.

To accommodate the variation in signal magnitudes as may be received from the single ratio transformer 106, some systems include variable circuitry after the single ratio transformer 106. For example, a programmable gain stage, such as a single input active programmable gain amplifier (PGA) 110, can be used to amplify or attenuate signals into a range preferred by an analog to digital converter (ADC) 114. As the programmable gain stage typically uses active components to amplify the signal, the programmable gain stage contributes to signal distortion, is limited by a noise floor, and is subject to signal magnitude offsets. Further filters, such as third filter 112, may be used to remove noise from the signal due to amplification by the PGA 110.

Typically, an Automatic Gain Control (AGC) system 116 is used to control the PGA 110 through a feedback loop 118. The ADC 114 outputs a digital signal at digital signal output 120. The digital signal may be representative of the received communication signal.

SUMMARY

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
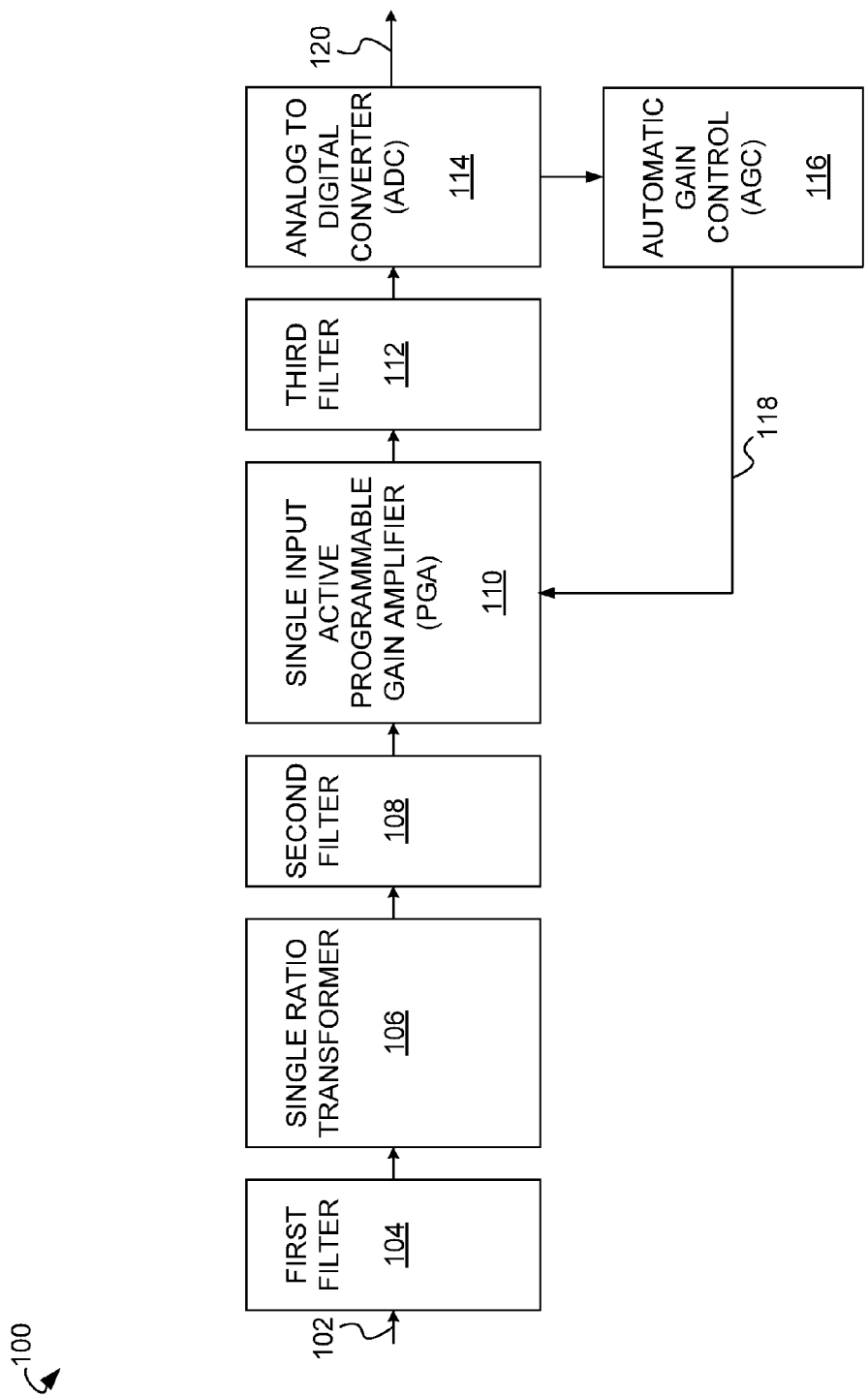
FIG. 1 is an illustration of a prior art system for processing a communication signal.

In various embodiments, a transformer is provided to transform the largest signal that can be present on the wireline into the largest signal that the signal processing circuitry can receive without damage. In other embodiments, a transformer is provided to transform signals present on the wireline such that signals of low magnitude can be detected over noise levels. Because of the wide range of signal magnitudes that may be input to the transformer, the signals may need to be selectively amplified or attenuated depending upon their magnitudes.

Various embodiments of the invention include systems and methods for processing a communication signal from a wireline. These systems comprise a coupling unit and signal processing circuitry. The coupling unit may be configured to generate a plurality of output signals, having different magnitudes, from a single input signal. This plurality of output signals may be generated using a transformer having a plurality of winding ratios. For example, the coupling unit may be configured to generate a first signal based on amplifying or attenuating a communication signal using a first winding ratio of the transformer, and to generate a second signal based on amplifying or attenuating the communication signal using a second winding ratio of the transformer. The signal processing circuitry processes at least one of the first signal and the second signal depending on which of these signals best matches the input voltage range of the signal processing circuitry. In some embodiments, the coupling unit is configured to communicate the communication signal in a first frequency band and a second frequency band. The coupling unit may be configured to transmit a second communication signal via the wireline. The wireline may include a first medium and a second medium. The first winding ratio may receive a first part of the communication signal from the first medium, and the second winding ratio may receive a second part of the communication signal from the second medium.

The first winding ratio and the second winding ratio may be established through a variety of approaches. For example, in some embodiments, the transformer comprises a secondary coil having at least a first tap and a second tap configured to transmit and receive signals according to first and second winding ratios, respectively. In some embodiments, the transformer comprises two separate secondary coils configured to transmit signals according to first and second winding ratios, respectively. In some embodiments, the transformer comprises a first transformer having a first winding ratio and a second transformer having a second winding ratio.

In some embodiments, the signal processing circuitry comprises a programmable gain amplifier including two input stages configured to provide different gain. For example, the signal processing circuitry may comprise a first gain input stage configured to receive the first signal and a second gain input stage configured to receive the second signal. The first gain input stage may have a greater gain than the second gain input stage. An automatic gain control system may be configured to control the programmable gain amplifier and a selection of either the first signal or the second signal.

Various embodiments include a method for processing a communication signal from a wireline. The method comprises receiving the communication signal from a wireline into a coupling unit comprising a transformer; generating, in the coupling unit, a first signal based on amplifying or attenuating the communication signal from a first winding ratio of the transformer; and generating, in the coupling unit, a second signal based on amplifying or attenuating the communication signal from a second winding ratio of the transformer. The method also includes, in signal processing circuitry, processing the first signal and the second signal. In some embodiments, the wireline includes a powerline. The method may also include outputting the first signal at a first tap of a secondary coil, and outputting the second signal at a second tap of the secondary coil.

Various embodiments include a system for processing a communication signal from a wireline, the system comprising a coupling unit including at least one transformer and configured to receive the communication signal from the wireline, to generate a first signal based on amplifying the communication signal from a first winding ratio of the at least one transformer, and to generate a second signal according to a second winding ratio of the at least one transformer. The system also comprises signal processing circuitry configured to process the first signal and the second signal.

A system for processing a communication signal from a wireline includes a coupling unit and signal processing circuitry. The coupling unit comprises at least one transformer configured to receive the communication signal from the wireline and to generate at least two signals. The signal processing circuitry is configured to process the two signals.

In some embodiments, by generating a first signal and a second signal, the system can handle a wider range of received communication signals, having greater variations in magnitude, relative to what is possible in the prior art. This may be accomplished by generating the first signal and the second signal such that the first signal and the second signal have different magnitudes relative to one another. For example, the system may be able to handle receiving relatively large communication signals without causing signal distortion, such as clipping, or damage to the signal processing circuitry. At the same time, the system may handle receiving relatively small communication signals without losing the signals due to a noise floor. The system may be used in a modem chip comprising low-voltage CMOS, wherein possible voltage and current ranges are limited.

Figure 2:
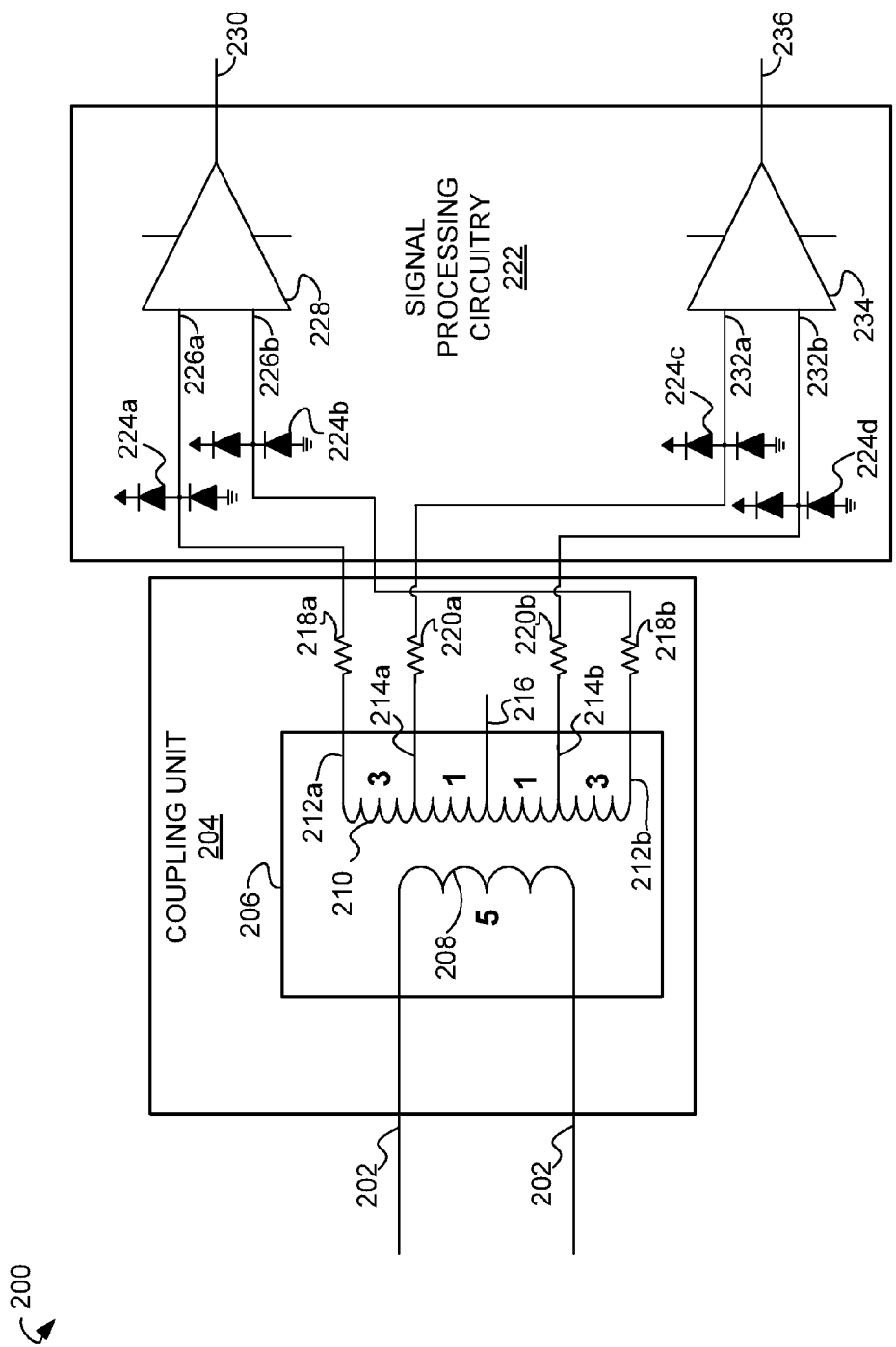
FIG. 2 is an illustration of a system configured for processing a communication signal from a wireline in exemplary embodiments of the invention.

FIG. 2 is an illustration of a system 200 configured for processing a communication signal from a wireline 202 in exemplary embodiments of the invention. The system 200 includes a coupling unit 204 and signal processing circuitry 222. In some embodiments, communication signals of a variety of magnitudes may be received via wireline 202. For example, signals of 10 volts peak-to-peak ($V_{p-p}$) and signals of 2.5 $V_{p-p}$ may both be received by coupling unit 210 via the wireline 202.

The coupling unit 204 comprises a transformer 206 configured to transform communication signals of various magnitudes received from wireline 202 such that the communication signals can be processed using the signal processing circuitry 222. The signal processing circuitry 222 may be configured to help extract transmitted information or data from the communication signal received from the wireline 202 by processing the signal from the coupling unit 204. Variations in the magnitudes of the communication signals may be due to the strength and position of a transmitter, impedance of the wireline 202, noise on the wireline 202, and/or the like. A filter, not shown, may optionally be disposed between the wireline 202 and the transformer 206 to filter the communication signals.

The transformer 206 is configured to generate two or more output signals using windings having two or more different winding ratios. A winding ratio is the number of windings in a secondary coil 210 as compared to the number of windings in a primary coil 208. The winding ratio determines the ratio of the voltage or current output from the transformer 206 relative to the received input. For example, a winding ratio of 2:5 (secondary to primary) will result in the output signal magnitude being reduced to two-fifths of the received signal magnitude. The transformer 206 generates a first signal based on amplifying or attenuating the received communication signal according to a first winding ratio of the transformer 206. The transformer 206 also generates a second signal based on amplifying or attenuating the received communication signal according to a second winding ratio of the transformer 206.

In various embodiments, the two or more different winding ratios are established using a variety of approaches. For example, the transformer 206 may comprise one secondary coil 210 having one or more taps as depicted in FIG. 2. As illustrated, secondary coil 210 includes taps 212a, 212b, 214a, 214b, and 216. The effective winding ratio is determined by the chosen taps of the secondary coil 210.

Alternatively, the transformer 206 may include a first secondary coil for amplifying the communication signal according to a first winding ratio and a second secondary coil for attenuating the communication signal according to a second winding ratio. In other embodiments, the transformer 206 may comprise a first transformer having the first winding ratio and a second transformer having the second winding ratio.

In FIG. 2, the winding ratio is indicated by a number next to the primary coil 208 ("5") and the numbers next to the secondary coil 210 ("3" or "1"). For example, the overall winding ratio of the secondary coil 210 to the primary coil 208 in the embodiment shown is (3+1+1+3):5 or 8:5. The magnitude of an output signal sampled at the outer outputs (taps 212a and 212b) of the full secondary coil will be $8/5^{ths}$ of the input signal to the transformer 206. Likewise, between the inner outputs (taps 214a and 214b) of the secondary coil, the winding ratio is 2:5 and the magnitude of the output signal will be $2/5^{ths}$ of the input signal. The amount of voltage gain or attenuation of the communication signal may further depend on the core material of the transformer 206, the location of a tap, the frequency of the communication signal, and/or the cross-sectional area of the core material.

An amplified communication signal generated at the taps 212a and 212b is referred to herein as the "first gain signal." Circuitry along which the first gain signal travels is referred to as the "first gain path." Likewise, a communication signal generated at the taps 214a and 214b is referred to herein as the "second gain signal." Circuitry along which the second gain signal travels is referred to as the "second gain path." In some embodiments, the center tap 216 may be coupled with electrical ground (0 V) to cause the amplitudes of the first gain signal and the second gain signal to be centered about 0 V.

In some embodiments, when a relatively small signal is received by coupling unit 204, the signal is amplified using transformer 206 and processed using the first gain path. When a relatively large signal is received by coupling unit 204, the signal is attenuated using transformer 206 and processed using the second gain path. For example, if a 10 $V_{p-p}$ signal is received from wireline 202, this signal may be transformed by a ratio of $2/5^{ths}$ to 4 $V_{p-p}$ at taps 214a and 214b and processed using the second gain path. If a 2.5 $V_{p-p}$ signal is received from wireline 202, this signal may be transformed by a ratio of $8/5^{ths}$ to 4 $V_{p-p}$ at taps 212a and 212b and processed using the first gain path. These winding ratios are for illustrative purposes only. Other winding ratios may be included in alternative embodiments.

In the embodiment shown in FIG. 2, the second gain path corresponds to a winding ratio of 2:5. In one example, a 10 $V_{p-p}$ communication signal is stepped down to a 4 $V_{p-p}$ second gain signal, resulting in a gain of −8 dB. In various embodiments, the winding ratio between taps 214a and 214b is greater than 1:10, 2:10, 3:5, 1:2, 1:1, or 2:1. In other embodiments, the winding ratio between taps 212a and 212b is less than 10:1, 10:2, 5:3, 2:1, 1:1, or 1:2. Further, in some embodiments, the variation in magnitude of the communication signals on the wireline 202 may range from approximately 10 $mV_{p-p}$ to 20 $V_{p-p}$.

The first gain path and second gain path include an amplifier 228 and an amplifier 234, respectively, within the signal processing circuitry 222. Amplifier 228 is configured to produce a first output signal at signal processing circuitry output 230, while amplifier 234 is configured to produce a second output signal at signal processing circuitry output 236. In some embodiments, amplifiers 228 and 234 are configured to receive input signals of similar magnitudes. For example, both amplifier 228 and 234 may be configured to receive signals with magnitudes ranging between 0.4 and 4 $V_{p-p}$. However, because of the different winding ratios to which the amplifiers 228 and 234 are coupled, these amplifier input ranges may correspond to a received communication signal range (from wireline 202) of 0.25 $V_{p-p}$ to 2.5 $V_{p-p}$ for amplifier 228 and 1 $V_{p-p}$ to 10 $V_{p-p}$ for amplifier 234.

Therefore, amplifiers 228 and 234 may be used to process received communication signals with magnitudes within substantially different voltage ranges. This difference in processing ranges may be achieved using a passive element (e.g., transformer 206). Typically, the use of a passive element to process received communication signals tends to introduce less noise into the processed signal than an active element.

The coupling unit 204 may further include optional current limiting resistors 218a, 218b, 220a, and/or 220b. The optional current limiting resistors 218a, 218b, 220a, and/or 220b may be configured to limit a voltage received by the signal processing circuitry 222. The optional current limiting resistors 218a and 218b may be coupled in series with the input ports 226a and 226b of the amplifier 228, and may also be coupled in with optional protection devices 224a and 224b, respectively. Likewise, the optional current limiting resistors 220a and 220b may be coupled in series with the input ports 232a and 232b of the amplifier 234, and may also be coupled with optional protection devices 224c and 224d, respectively. As illustrated, the optional protection devices 224a-d are disposed within the signal processing circuitry 222. Alternatively, any of the optional current limiting resistors and/or optional protection devices may be disposed within the coupling unit 204, signal processing circuitry 222, or neither.

The protection devices 224 may protect the amplifiers 228 and 234 from events such as the discharge of a static charge or other extraordinary events. In one example, the protection devices 224 are configured to protect the amplifiers 228 and 234 by clamping input voltages between certain values. When voltages from the secondary coil 210 exceed these values, current may flow through the protection devices 224 and voltage may be dropped across the current limiting resistors 218 and 220. In some embodiments, the protection devices 224 comprise an electrostatic discharge (ESD) diode, a transistor having a specified breakdown voltage, or the like.

Figure 3:
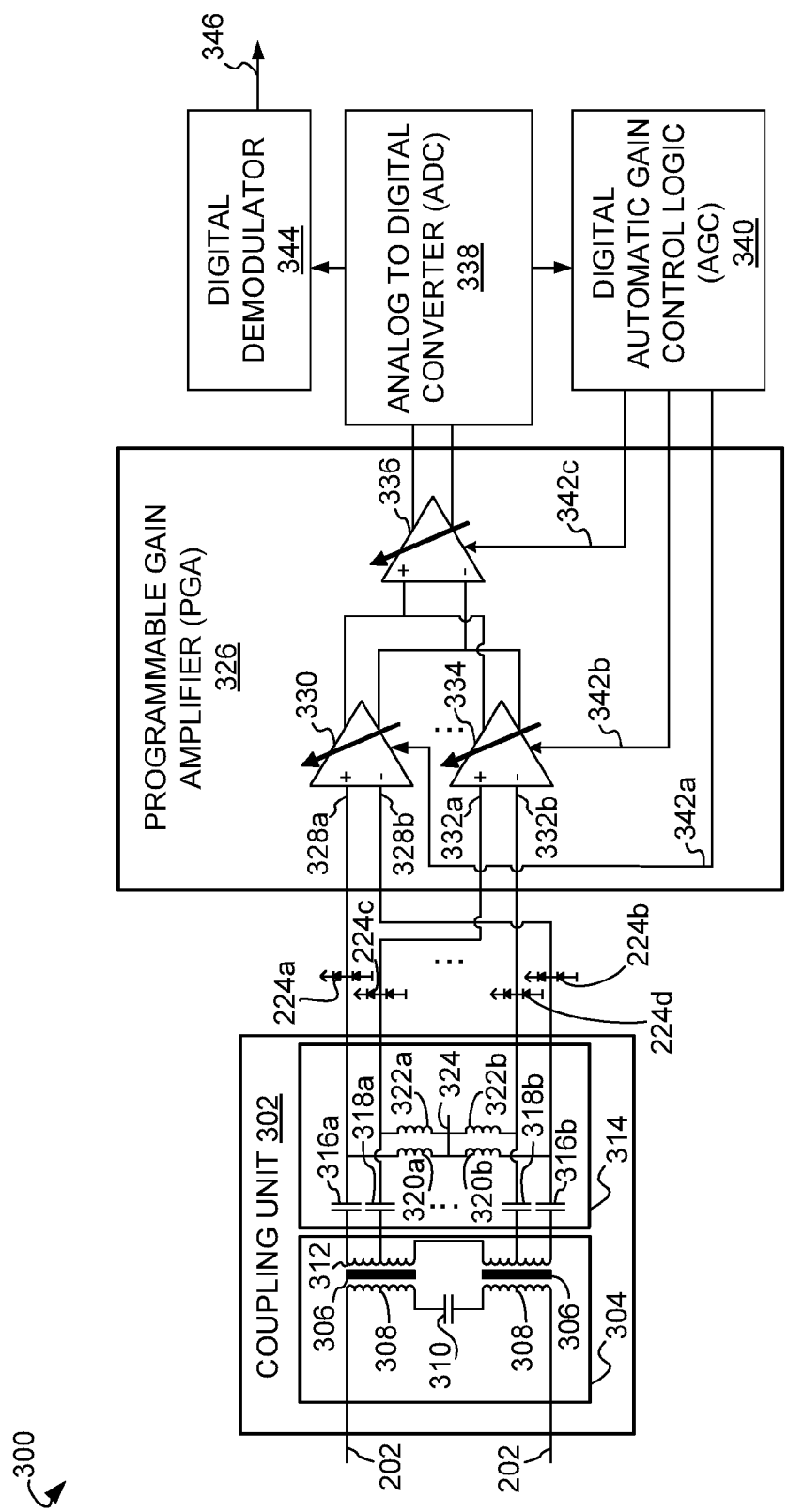
FIG. 3 depicts alternative embodiments of the system of FIG. 2 including a programmable gain amplifier.

FIG. 3 depicts alternative embodiments of the system of FIG. 2 including a programmable gain amplifier 326. As illustrated, system 300 includes a coupling unit 302, the programmable gain amplifier (PGA) 326, an analog to digital converter (ADC) 336, a digital automatic gain control logic (AGC) 340, and a digital demodulator 344. The coupling unit 302 may be an alternate embodiment of the coupling unit 204, described with reference to FIG. 2. Further, the PGA 326, ADC 336, AGC 340, and digital demodulator 344 may correspond to the signal processing circuitry 222, described with reference to FIG. 2. In various embodiments, the system 300 is configured to receive an analog communication signal from the wireline 202, process the analog communication signal, and convert the analog communication signal to a digital output signal at the digital demodulator output 346. The digital output signal may be processed further using, for example, CMOS or BiCMOS circuitry.

The coupling unit 302 includes a transformer 304 and an impulsive noise limiting high pass filter 314. The transformer 304 may be an alternate embodiment of the transformer 206, described with reference to FIG. 2. The transformer 304 includes a primary coil 308, a core 306, and a secondary coil 312. The primary coil 308 is coupled to the wireline 202. The transformer 304 may optionally include a low frequency capacitor 310 configured to reject low frequency noise, such as a 60 Hz power signal, from the wireline 202. In some examples, the low frequency capacitor 310 may be of type Y1, Y2, X1, or X2 class. The secondary coil 312 of the transformer 304 comprises a plurality of taps coupled to the impulsive noise limiting high pass filter 314. The impulsive noise limiting high pass filter 314 includes a network of capacitors such as capacitors 316a, 316b, 318a, and 318b and inductors such as inductors 320a, 320b, 322a, and 322b coupled between the plurality of taps of the secondary coil 312 and the PGA 326. The impulsive noise limiting high pass filter 314 optionally further includes a direct current (DC) bias 324. Other passive filters may be included in the coupling unit 302 as will be apparent to those skilled in the art.

The PGA 326 comprises a low magnitude input signal amplifier 330, a high magnitude input signal amplifier 334, and an optional final amplifier stage 336. The low magnitude input signal amplifier 330 is optionally configured to receive signals of lower magnitude than the high magnitude input signal amplifier 334. For example, the low magnitude input signal amplifier 330 may be configured to process (e.g., amplify) a first gain signal received from the outer taps of the secondary coil 312. Likewise, the high magnitude input signal amplifier 334 may be configured to process the second gain signal received from the inner taps of the secondary coil 312. In some embodiments, the low magnitude input signal amplifier 330 has a greater gain than the high magnitude input signal amplifier 334. The outputs of the low magnitude input signal amplifier 330 and the high magnitude input signal amplifier 334 are provided to the final amplifying stage 336.

The inputs 328a and 328b of the low magnitude input signal amplifier 330 may be coupled with protection structures such as protection devices 224a and 224b. Likewise, the inputs 332a and 332b of the high magnitude input signal amplifier 334 may be coupled with protection structures such as protection devices 224c and 224d. The low magnitude input signal amplifier 330 and the high magnitude input signal amplifier 334 are optionally embodiments of amplifiers 228 and 234, described with reference to FIG. 2. In some examples, the low magnitude input signal amplifier 330 and the high magnitude input signal amplifier 334 may have a fixed gain.

The final amplification stage 336 is configured to process signals received from the low magnitude input signal amplifier 330 and the high magnitude input signal amplifier 334. The signals may be processed such that a signal output from the final amplification stage 336 to the ADC 336 is provided with a desired signal-to-noise ratio. For example, the desired signal-to-noise ratio may be at least 30 dB. The desired signal-to-noise ratio may depend on the bit resolution of the ADC 336.

The ADC 336 provides feedback to the AGC 340 based on the output of the final amplification stage 336. The feedback is provided to form a feedback control loop with the PGA 326. The AGC 340 is configured to generate control signals 342a, 342b, and 342c. The control signals 342a, 342b, and 342c are used by the PGA 326 to control the low magnitude input signal amplifier 330, the high magnitude input signal amplifier 334, and/or the final amplification stage 336, respectively. The control signals 342a and 342b may be used to ensure that the final amplification stage 336 receives input signals from only one of the low magnitude input signal amplifier 330 and the high magnitude input signal amplifier 334. The control signals 342a, 342b, and 342c may also be used to control the gain of the low magnitude input signal amplifier 330, the high magnitude input signal amplifier 334, and the final amplification stage 336, respectively.

The ADC 336, which may comprise a pipeline ADC, may be configured to convert a communication signal having the desired signal-to-noise ratio to a digital signal. The ADC 336 may output the digital signal to the digital demodulator 344. After the communication signal is converted to the digital signal, the digital demodulator 344 demodulates the digital signal to extract digital information content and output the digital output signal which may be further processed by other devices.

Figure 4:
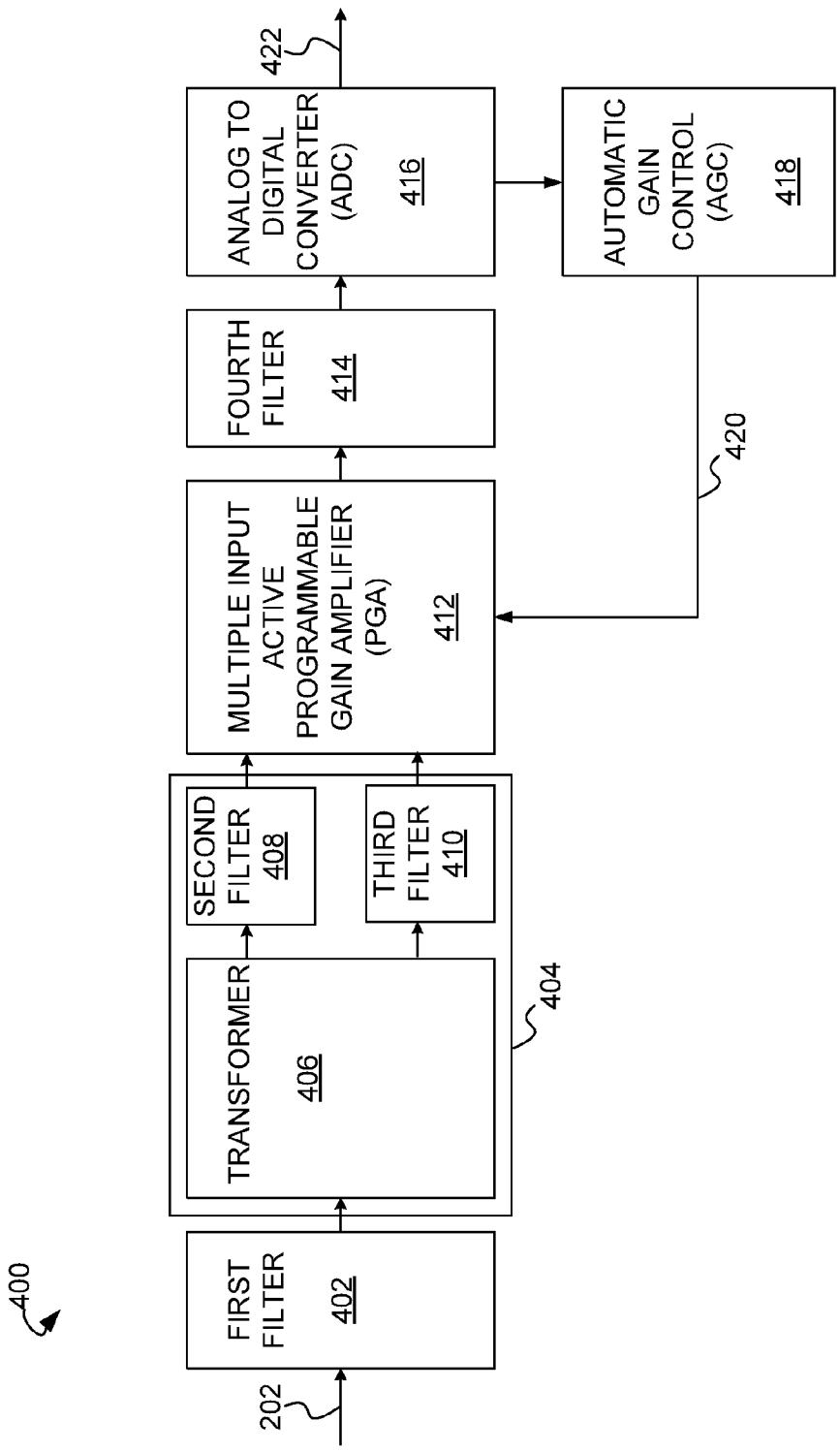
FIG. 4 depicts alternative embodiments of the system of FIG. 2 including a feedback path.

FIG. 4 depicts alternative embodiments of the system of FIG. 2 including a feedback path. Signals from wireline 202 may be received by a first filter 402. The first filter 402 may be configured to separate communication signals from other signals carried by the wireline 202. For example, a high frequency communication signal may be separated from one or more low frequency signals, such as a 60 Hz power signal.

The system 400 includes a coupling unit 404 which receives input from the first filter 402. The coupling unit 404 may be an alternate embodiment of the coupling unit 204 or the coupling unit 302, described with reference to FIGS. 2 and 3. The coupling unit 404 includes a transformer 406 having more than one winding ratio. The transformer 406 may be an alternate embodiment of the transformer 206 or 304, described with reference to FIGS. 2 and 3. The coupling unit 404 may further include one or more filters, such as second filter 408 and third filter 410. The second filter 408 and third filter 410 may filter one or more signals output from one or more secondary coils of transformer 406. In some examples, the second filter 408 and third filter 410 may include high pass filters.

The system 400 may include alternative embodiments of signal processing circuitry 222 (described with reference to FIG. 2) which may include a multiple input active programmable gain amplifier (PGA) 412, a fourth filter 414, an analog to digital converter (ADC) 416, and an automatic gain control (AGC) 418. The PGA 412 is optionally configured to process a communication signal received from the coupling unit 404 such that the communication signal has a signal-to-noise ratio of at least 30 dB, for example. The PGA 412 may be controlled using feedback 420 provided by the AGC 418. The fourth filter 414 may be configured to filter a signal received from the PGA 412. The ADC 416 may be configured to convert the filtered analog communication signal to a digital output signal at digital signal output 422. The ADC 416 may also generate a signal that is processed by the AGC 418 to generate the feedback 420 to the PGA 412. In various embodiments, the first filter 402, the second filter 408, the third filter 410, and/or the fourth filter 414 include analog signal processing circuitry. Some embodiments include a separate instance of ADC 416 for each of the first gain path and the second gain path.

Figure 5:
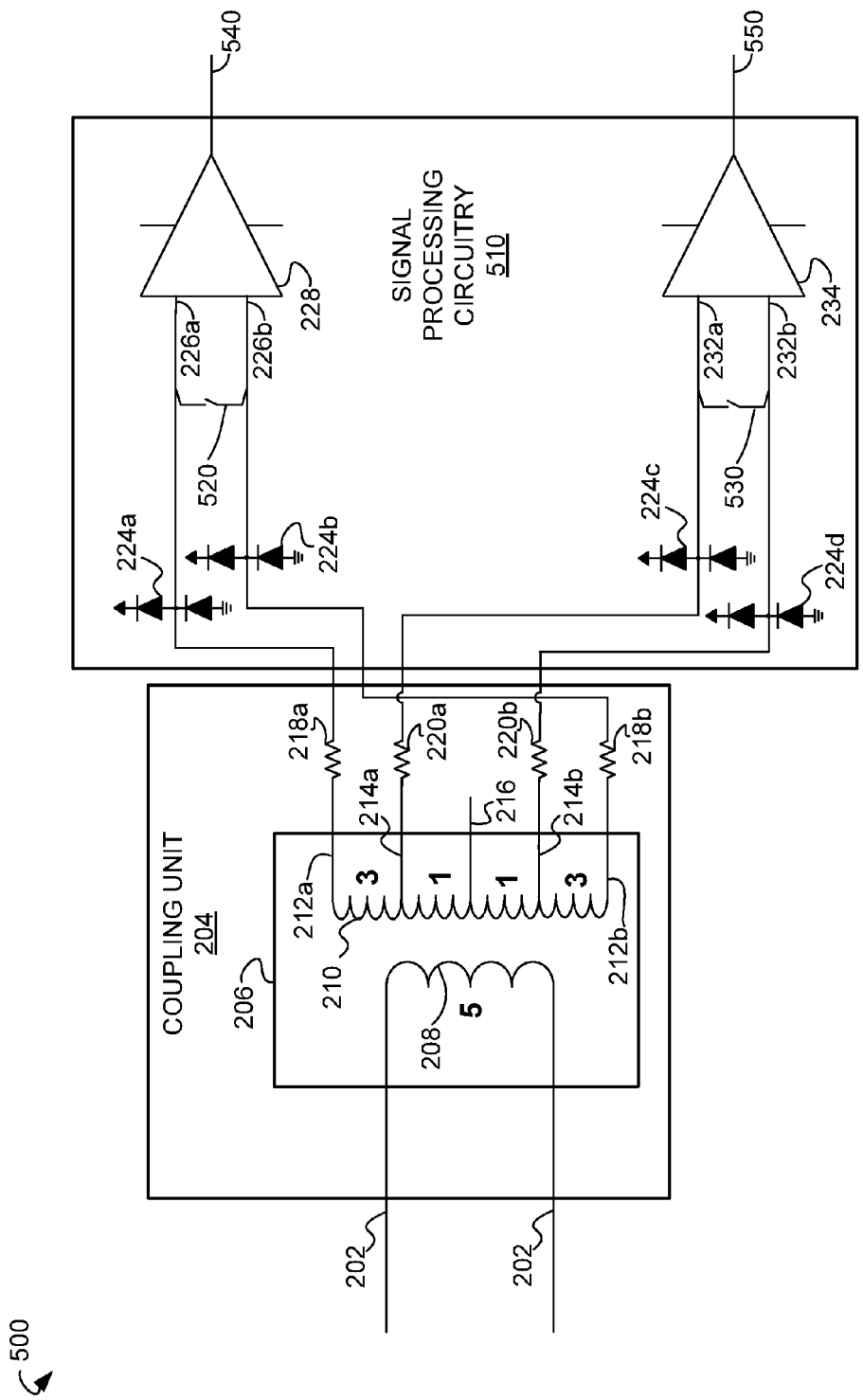
FIG. 5 depicts alternative embodiments of the system of FIG. 2 including a plurality of switches.

FIG. 5 depicts alternative embodiments of the system of FIG. 2 including a plurality of switches. The system 500 includes signal processing circuitry 510 configured to generate a first output signal at first signal processing circuitry output 540 from a first gain path and a second output signal at second signal processing circuitry output 550 from a second gain path. The signal processing circuitry 510 of system 500 may be an alternate embodiment of the signal processing circuitry 222 of system 200, further including a first gain switch 520 and a second gain switch 530. The first gain switch 520 may be configured to short circuit the inputs 226a and 226b of amplifier 228. The second gain switch 530 may be configured to short circuit the inputs 232a and 232b of amplifier 234. In some embodiments, only one of the first gain switch 520 and the second gain switch 530 is open at a time. Thus, only one of amplifiers 228 and 234 may receive signals at the same time. For example, the first gain switch 520 may be closed to short circuit the inputs 226a and 226b of amplifier 228 when the amplifier 234 is activated by the signal processing circuitry 510.

First gain switch 520 and second gain switch 530 may serve two purposes. The first purpose is that the first gain switch 520 and the second gain switch 530 may protect the inputs of amplifiers 228 and 234 from excessively large signal magnitudes. For example, if a 10 $V_{p-p}$ signal is received from wireline 202, a voltage across taps 212a and 212b would include a signal of 16 $V_{p-p}$ as a result of the winding ratio in the embodiment of transformer 206 illustrated in FIG. 5. While this 10 $V_{p-p}$ voltage may substantially be prevented from reaching amplifier 228 by protection devices 224a and 224b, if switch 520 were closed, switch 520 would reduce the required current carrying capacity of protection devices 224a and 224b. When switch 520 is closed, the 10 $V_{p-p}$ voltage would be dropped across current limiting resistors 218a and 218b.

The second purpose is that the first gain switch 520 and the second gain switch 530 may be used to regulate the impedance load on the wireline 202 that is caused by the system 500. For example, by choosing appropriate values of current limiting resistors 218a, 218b, 220a, and 220b, and using switches 520 and 530, a relatively constant impedance load can be maintained on the wireline 202 even when the output of secondary coil 210 is sampled using different taps such as 212a and 212b or 214a and 214b. In some embodiments, the values of current limiting resistors 218a, 218b, 220a, and 220b are configured such that the ratio of the resistance between the current limiting resistors 218a and 218b and the current limiting resistors 220a and 220b is the square of the ratio of windings between the first gain path and the second gain path. For example, if the ratio of windings between the first gain path and the second gain path is 8:2, as in FIG. 5, the ratio of the resistances of current limiting resistors 218a and 218b and current limiting resistors 220a and 220b may be 16:1.

Switches 520 and 530 may be optionally controlled by a feedback signal (not shown) received from other elements of system 500. For example, the feedback signal may be received from embodiments of PGA 412, ADC 418, or AGC 418. If a signal is being processed using amplifier 228 via the first gain path, and a system element providing feedback determines that the signal being received or input to the amplifier 228 is too large for the amplifier 228 to process, then the feedback signal is used to close switch 520 and open switch 530 such that the second gain path is activated and the signal can be processed using amplifier 234. A similar process may occur when the signal received is too small for amplifier 234 to process.

Figure 6:
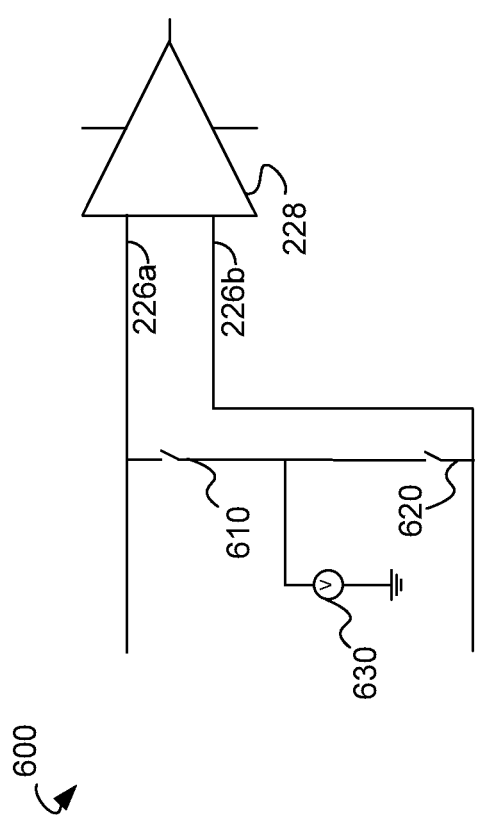
FIG. 6 depicts alternative embodiments of a subsystem including a voltage source and switches that are provided as an alternative to the switches of the system of FIG. 5.

FIG. 6 depicts alternative embodiments of a subsystem 600 including a voltage source 630 and switches 610 and 620 that are provided as an alternative to the switches 520 and 530 of the system of FIG. 5. The subsystem 600 replaces the amplifier 228 and switch 520 of the system 500 illustrated in FIG. 5. The subsystem 600 may also replace the amplifier 234 and switch 530 of the system 500 illustrated in FIG. 5. The subsystem 600 enables an input signal voltage to the amplifier 228 to be controlled. For example, if the signal voltage level from coupling unit 204 is offset and/or AC-coupled, the voltage source 630 can be used to control the signal voltage level from the coupling unit 204. The inputs 226a and 226b of the amplifier 228 are connected to the electrostatic discharge devices 224a and 224b. The switch 610 is connected between the input 226a of the amplifier 228 and the voltage source 630. Likewise, the switch 620 may be connected between the input 226b of the amplifier 228 and the voltage source 630. The switches 610 and 620 control a connection to the voltage source 630 which may be used to clamp an input signal to the amplifier 228 to within a specified voltage range. For example, the switches 610 and 620 may be configured to clamp the inputs 226a and 226b of the amplifier 228 to a voltage of the voltage source 630 if the signal processing circuitry 510 activates the amplifier 234 (described with reference to FIG. 5). The voltage source 630 may include, for example, a power rail, an op-amp, or the like.

Several embodiments are specifically illustrated and/or described herein. However, it will be appreciated that modifications and variations are covered by the above teachings and within the scope of the appended claims without departing from the spirit and intended scope thereof. For example, transformer 206 may be configured to include more than two winding ratios. In a half duplex communication protocol, one winding ratio may be used for transmission and another winding ratio or both winding ratios may be used for reception. Some windings may be used for both transmission and reception. In other examples, the transformer 206 may be used for both transmission and reception of signals. In some embodiments, the signal passes through media such as telephone lines and/or coaxial cable in addition to or instead of the power line. In some embodiments, the transformer 206 is used for communication in more than one frequency band. For example, the transformer 206 may transmit a signal in a first frequency band and receive a separate signal in a second frequency band. In some embodiments, there may be other components in parallel to or in series with embodiments of the present invention, the other components configured to filter or condition signals. Amplification of a signal may also include attenuation of the signal, or amplification by a negative amplification factor. An amplifier may also provide unity gain.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system for processing a communication signal from a wireline, the system comprising:
   a coupling unit comprising a transformer and configured to receive the communication signal from the wireline, the transformer including a primary coil and a secondary coil, the secondary coil including a plurality of taps, the coupling unit:
   generating a first signal along a first gain path based on amplifying the communication signal from a first winding ratio of the transformer determined by selecting a first set of the plurality of taps, and
   generating a second signal along a second gain path different from the first gain path according to a second winding ratio of the transformer determined by selecting a second set of the plurality of taps; and signal processing circuitry configured to process the first signal and the second signal.

2. The system of claim 1, wherein the plurality of taps are configured to both transmit and receive a signal according to a winding ratio corresponding to the respective taps.

3. The system of claim 1, wherein the coupling unit is configured to communicate the communication signal in a first frequency band and a second frequency band.

4. The system of claim 1, wherein the at least one transformer comprises a first secondary coil including the first winding ratio and a second secondary coil including the second winding ratio.

5. The system of claim 1, wherein the signal processing circuitry comprises a programmable gain amplifier, the programmable gain amplifier comprising a first gain input stage configured to receive the first signal and a second gain input stage configured to receive the second signal.

6. The system of claim 5, further comprising an automatic gain control system configured to control the programmable gain amplifier and a selection of either the first signal or the second signal.

7. The system of claim 5, wherein the programmable gain amplifier further comprises a final amplification stage coupled to the first gain input stage and the second gain input stage.

8. The system of claim 1, wherein the coupling unit further comprises at least one series resistor configured to limit a voltage received by the signal processing circuitry in conjunction with shorting, clamping, or protection structures.

9. The system of claim 8, wherein the signal processing circuitry further comprises at least one switch configured to short circuit a first input stage of the signal processing circuitry if the signal processing circuitry activates a second input stage of the signal processing circuitry.

10. The system of claim 8, wherein the signal processing circuitry further comprises at least one switch configured to clamp a first input stage of the signal processing circuitry if the signal processing circuitry activates a second input stage of the signal processing circuitry.

11. The system of claim 1, wherein the first winding ratio is configured to amplify the communication signal by a positive amplification factor and the second winding ratio is configured to attenuate the communication signal.

12. The system of claim 1, wherein the coupling unit is configured to transmit a second communication signal via the wireline.

13. The system of claim 1, wherein the wire line comprises a powerline.

14. The system of claim 1, wherein the wireline comprises a telephone line.

15. The system of claim 1, wherein the wire line comprises a coaxial cable.

16. The system of claim 1, wherein the wireline includes a first medium and a second medium, the first winding ratio configured to receive a first part of the communication signal from the first medium and the second winding ratio configured to receive a second part of the communication signal from the second medium.

17. A method for processing a communication signal from a wireline, the method comprising:
receiving the communication signal from a wireline at a coupling unit comprising a transformer including a primary coil and a secondary coil, the secondary coil including a plurality of taps;
in the coupling unit, generating a first signal along a first gain path based on amplifying or attenuating the communication signal using a first winding ratio of the transformer determined by selecting a first set of the plurality of taps;
in the coupling unit, generating a second signal along a second gain path different from the first gain path based on amplifying or attenuating the communication signal using a second winding ratio of the transformer determined by selecting a second set of the plurality of taps; and
processing the first signal and the second signal in signal processing circuitry.

18. The method of claim 17, wherein the wire line comprises a power line.

19. The method of claim 17, further comprising: processing the first signal at a first gain input stage in a programmable gain amplifier; and processing the second signal at a second gain input stage in the programmable gain amplifier.

20. The method of claim 19, further comprising controlling the programmable gain amplifier using an automatic gain control system.

* * * * *